US007262417B2

(12) United States Patent
Smith

(10) Patent No.: US 7,262,417 B2
(45) Date of Patent: Aug. 28, 2007

(54) METHOD AND SYSTEM FOR IMPROVED IMAGE RECONSTRUCTION AND DATA COLLECTION FOR COMPTON CAMERAS

(75) Inventor: Bruce Douglas Smith, San Antonio, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 226 days.

(21) Appl. No.: 10/811,069

(22) Filed: Mar. 26, 2004

(65) Prior Publication Data

US 2005/0211909 A1    Sep. 29, 2005

(51) Int. Cl.
*G01T 1/00*    (2006.01)
(52) U.S. Cl. .................. 250/393; 250/394; 250/395
(58) Field of Classification Search ............. 250/393, 250/394, 395, 363.01, 363.04, 363.05, 370.09
See application file for complete search history.

(56) References Cited

U.S. PATENT DOCUMENTS

| 4,833,327 | A | * | 5/1989 | Hart ...................... 250/363.01 |
| 4,857,737 | A | * | 8/1989 | Kamae et al. ......... 250/370.09 |
| 5,175,434 | A | * | 12/1992 | Engdahl .................... 250/366 |
| 5,567,944 | A | * | 10/1996 | Rohe et al. ............. 250/370.09 |
| 5,665,971 | A | * | 9/1997 | Chen et al. ............... 250/385.1 |
| 5,742,056 | A | * | 4/1998 | Valentino et al. ....... 250/363.03 |
| 5,841,141 | A | * | 11/1998 | Gullberg et al. ....... 250/363.04 |
| 5,861,627 | A |   | 1/1999 | Basko et al. ........... 250/363.04 |
| 5,930,384 | A | * | 7/1999 | Guillemaud et al. ........ 382/154 |
| 6,292,525 | B1 | * | 9/2001 | Tam .............................. 378/4 |
| 6,330,298 | B1 | * | 12/2001 | Tam .............................. 378/4 |
| 6,539,103 | B1 | * | 3/2003 | Panin et al. ................. 382/131 |
| 6,628,984 | B2 | * | 9/2003 | Weinberg .................... 600/436 |
| 6,665,369 | B2 | * | 12/2003 | Ukita ............................ 378/4 |
| 6,791,090 | B2 | * | 9/2004 | Lin et al. ..................... 250/367 |

OTHER PUBLICATIONS

Schwartz et al, "Lamb wave tomographic imaging system for aircraft structural health assessment," 1999, SPIE Conference on Nondestructive Evaluation of Aging Aircraft, Airports, and Aerospace Hardware III, SPIE vol. 3586, p. 292.*
Parra et al., "Reconstruction of cone-beam projections from Compton scattered data," Transactions on Nuclear Science., vol. 47, No. 4, 2000.*
Basko et al., "Application of spherical harmonies to image reconstruction for the Compton camera," *Phys. Med. Biol.*, 43:887-894, 1998.
Cree and Bones, "Towards direct reconstruction from a gamma camera based on Compton scattering," 13(2):398-407, 1994.
Evans et al., "Deconvolution of shift-variant broadening for Compton scatter imaging," *Nuclear Instrumetns and Methods in Physics Research A*, 422:661-666, 1999.

(Continued)

*Primary Examiner*—David Porta
(74) *Attorney, Agent, or Firm*—Fulbright & Jaworski LLP

(57) ABSTRACT

Systems and methods are described for image reconstruction. A set of conical integrals are calculated to satisfy a completeness condition and are related to a distribution of radioactivity.

35 Claims, 4 Drawing Sheets

OTHER PUBLICATIONS

Horn, "Density reconstruction using arbitrary ray-sampling schemes," *Proc. IEEE*, 66(5):551-562, 1978.

Sauve et al., "3D image reconstruction for a Copmton SPECT camera model," *IEEE Transactions on Nuclear Science*, 46(6):2075-2084, 1999.

Smith et al., "Practical and mathematical aspects of the problem of reconstructing objects from radiographs," Bull. Amer. Math. Soc., 83:1227-1270, 1977.

Smith, "Computer-aided tomography imaging from cone-beam data," Ph.D. Thesis, University of Rhode Island, 1987.

Smith, "Cone-beam tomography: recent advances and a tutorial review," *Optical Engineering*, 29(5):524-534, 1990.

Smith, "Image reconstruction from cone-beam projections: necessary and sufficient conditions and reconstruction methods," *IEEE Transactions of Medical Imaging*, MI-4:14-28, 1985.

* cited by examiner

METHOD AND SYSTEM FOR IMPROVED IMAGE RECONSTRUCTION AND DATA COLLECTION FOR COMPTON CAMERAS

BACKGROUND OF THE INVENTION

1. Field of the Invention

The invention relates generally to the field of imaging. More particularly, the invention relates to methods and systems for image reconstruction using cameras, such as Compton cameras.

2. Discussion of the Related Art

In vivo imaging methods, such as Single Positron Emitting Computed Tomography (SPECT), use gamma radio tracers to track biochemical, molecular, and/or physiopathological processes of various human diseases. Further, such imaging methods may provide detection of contaminates in a nuclear facility and nuclear waste sites as well as serve as a defense utility by imaging radiation activity on missiles, planes, etc. Radiation emitted from the target of interest are detected by a gamma ray camera device of the imaging system which forms an image of the target based on the concentration and distribution of the radioactive material, e.g., gamma radio tracers within the target.

Conventional gamma ray cameras usually include a plurality of detectors For example, the Anger camera includes collimators within the detectors to limit radiation trajectories observed by the detector. In addition, conventional gamma cameras are stationary within an imaging system, allowing only one view of the target to be observed. However, conventional cameras are inefficient because the cameras lack the ability to image two or more isotopes at the same time.

Recently, Compton cameras have been integrated into imaging systems as an alternative to the conventional gamma cameras to further enhance and improve upon the quality of images being reconstructed. For example, the Compton camera can detect one to two orders more radiation emissions, such as photons emitted from a target, than a conventional camera. In addition, the Compton camera can readily image a relatively wide range of energies. Generally, Compton cameras include two semiconductor detectors configured in parallel with one another. The first detector may be capable of measuring the radiation emitted from a target, such as a photon emission. In particular, the first detector measures the point in which the photon contacts the first detector as well as the amount of energy lost by the photon when the photon goes through Compton scattering within the detector. As a result of the scatter, the photon travels in a new direction and interacts with the second detector, in which the second detector can measure the point at which the photon contacts the second detector.

Current methods for image reconstruction utilizes the cone projection data collected from the Compton camera and convert the data into plane projection data. Such methods may include using an infinite series expansion to calculate the plane projection data. However, such methods require an a large number of calculations to be performed, and therefore requires a greater number of resources to be utilized and may produce poor quality images.

The referenced shortcomings are not intended to be exhaustive, but rather are among many that tend to impair the effectiveness of previously known techniques concerning image reconstruction however, those mentioned here are sufficient to demonstrate that methodology appearing in the art have not been altogether satisfactory and that a significant need exists for the techniques described and claimed in this disclosure.

SUMMARY OF THE INVENTION

Thus, there is a need for methods and systems that provide an efficient and accurate techniques for image reconstruction.

In one embodiment, the invention involves a method. The trajectory of a photon from an object through a first detector determines an apex of the cone at the point of intersection with the first detector. The trajectory of the photon through the first detector onto a second detector determines an axis of symmetry of the cone. Using the apex and axis of symmetry of the cone, a set of integrals are calculated and used for image reconstruction.

In another respect, a method for image reconstruction. A set of conical integrals, such as surface integrals or integrated cone-beam line integrals are calculated to satisfy a completeness condition. The set of integrals are then related to a distribution of radioactivity.

In another aspect, a computer readable medium including instructions is used to determine an apex and an axis of symmetry of a cone. The apex and the axis of symmetry is use to calculate a set of integrals, such as surface or integral line integrals, to satisfy a complete condition. After the calculation of the set of integrals are complete, instructions are provided to reconstruct an image.

In another respect, a system may include a camera, such as a Compton camera and first and second detectors that are configured to obtain data to satisfy the completeness condition.

These, and other, embodiments of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of the invention without departing from the spirit thereof, and the invention includes all such substitutions, modifications, additions and/or rearrangements.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore nonlimiting, embodiments illustrated in the drawings, wherein like reference numerals (if they occur in more than one view) designate the same or similar detectors. The invention may be better understood by reference to one or more of these drawings in combination with the description presented herein. It should be noted that the features illustrated in the drawings are not necessarily drawn to scale.

DESCRIPTION OF PREFERRED EMBODIMENTS

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

In one embodiment, a reconstruction method which calculates a finite set of data to obtain a relationship between the calculations and a distribution of radioactivity from an object is provided. In one embodiment, the object may be a human or an animal having radioisotopes delivered internally for imaging. In another embodiment, the object may be a nuclear facility or a nuclear waste site in which the reconstruction method may determine the distribution of contaminates within the facility. In yet another embodiment, the object may be a missile, where a number of nuclear warheads on the missile may be determined.

Figure 1:
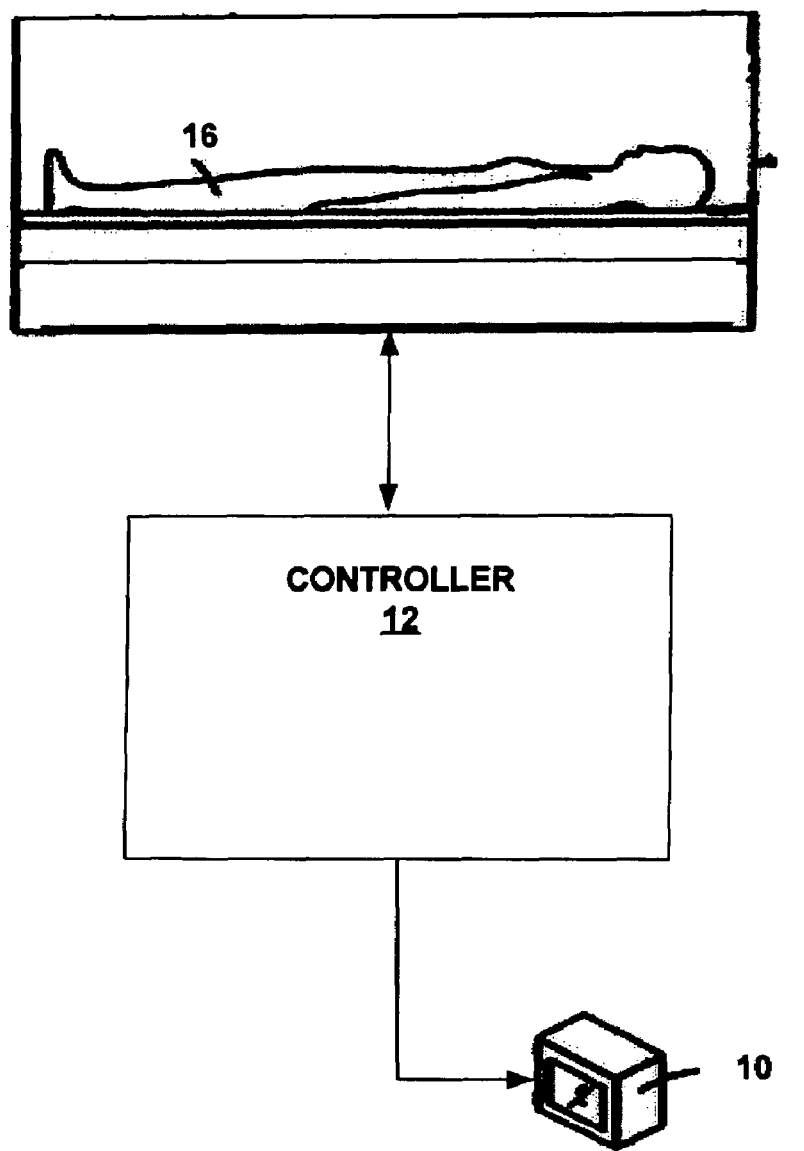
FIG. 1 illustrates an image reconstruction system, according to embodiments of the disclosure.

To reconstruct an image of an object, such as patient 16, a system 14 may include a Compton camera, which receives data from the radioactivity emitting from the object, as illustrated in FIG. 1. A controller 12, coupled to the system 14, obtains the data, processes the data to obtain desired image(s), and outputs the final image(s) to an output device of choice, such as a display monitor 10. In one embodiment, the controller 12 processes a plurality of measurements from the camera, such as surface integrals from a cone projection. In another embodiment, the controller 12 processes a plurality of integrated line integrals from a cone projection.

I. Relating Surface Integrals to a Distribution of Radioactivity

According to one embodiment of the invention, the image reconstruction may be calculated from data collected by a Compton camera. In particular, a sequence of cone surface integrals within a predetermined set may be calculated. The predetermined set may identify what calculations are needed to reconstruct an image of an object. Subsequently, the sequence of surface integrals may be related to the distribution of radioactivity and an image of the object may be obtain using Hilbert transforms and the partial derivatives of a three-dimensional Radon transform.

Figure 2:
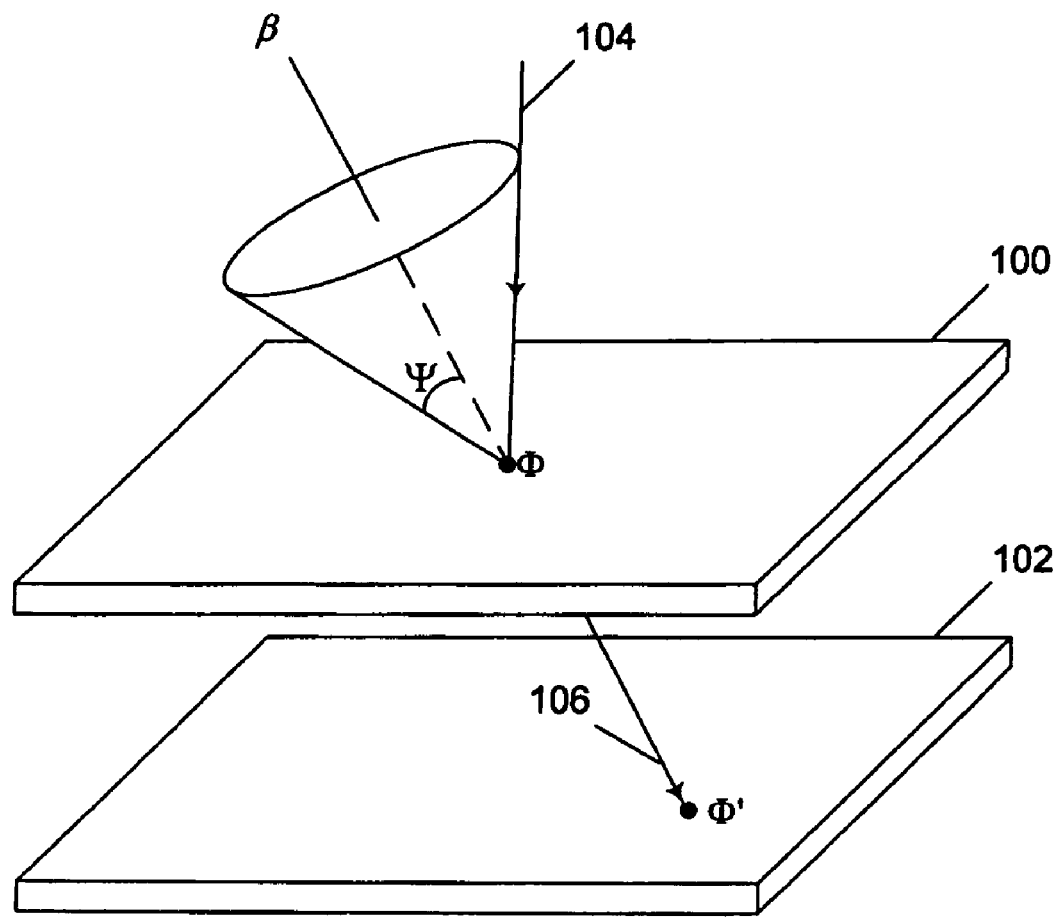
FIG. 2 is a block diagram of components within a Compton camera, according to embodiments of this disclosure.

The surface integrals may be calculated from a cone projected from the interaction of a photon through detectors of a Compton camera. Referring to FIG. 2, the trajectory of a photon 104 from an object may intersect a first detector 100 at point $\Phi$. Point $\Phi$ may be defined as an apex of the cone. The photon may undergo Compton scattering causing a change trajectory of the photon (as illustrated by arrow 106) through the first detector 100 onto the second detector 102. In one embodiment, the angle change between the trajectory (arrow 104) from the object to the first detector and the trajectory from the first detector 100 to the second detector 102 (arrow 106) may be defined as a half angle $\psi$ of the cone where vector $\beta$, which may extend from point $\Phi'$ through point $\Phi$, may be axis of symmetry of the cone. Thus, symbol $S(\Phi, \beta, \psi)$ may denote the surface integral of the distribution of radioactivity on the one sheet cone whose apex may be the point $\Phi$, axis of symmetry may be the unit vector $\beta$, and half angle may be $\psi$.

In order to determine the source of the radioactivity, the distribution of radioactivity at point $\chi$ may be defined as $f(\chi)$. In one embodiment, it may be assumed that $f(\chi)=0$ for $|\chi|>R$, where R may be the radius of the distribution activity. The vectors $\Phi$, $\beta$, and $\chi$ may also be described in terms of a global coordinate system. Let vectors $\Phi$, $\beta$, and $\chi$ be described in terms of a global coordinate system. A local coordinate system, where a "z" axis points in the direction of vector $\beta$ may be used in expressing in a spherical coordinate system by letting:

$$\alpha \triangleq \alpha(\phi, \psi) \triangleq (\cos\phi\sin\psi, \sin\phi\sin\psi, \cos\psi)^T \quad (1)$$

where $\psi$ may be the angle measured from the "z" axis. Using a standard calculus equation the surface integral may be calculated, where:

$$S(\Phi, \beta, \psi) = \sin\psi \int_{\phi=0}^{2\pi} \int_{r=0}^{\infty} f(\Phi + rM^T\alpha(\phi, \psi)) r \, dr \, d\phi, \quad (2)$$

where the rotation matrix $M^T$ may be defined as $$M^T = [\beta_{\perp 1} | \beta_{\perp 2} | \beta] \quad (3)$$

where $\beta$, $\beta_{\perp 1}$ and $\beta_{\perp 2}$ are three orthonormal column vectors in $\Re^3$.

To relate a surface integral to the distribution of radioactivity, a new function $C(\beta,l)$ may be defined as:

$$C(\beta, l) \triangleq \lim_{\varepsilon \to 0} \int_{-\infty}^{\infty} \check{f}(\beta, t) p_\varepsilon(l-t) dt, \quad (4)$$

where $$p_\varepsilon(t) \triangleq \begin{cases} \frac{1}{t} & \text{for}|t| > \varepsilon, \\ 0 & \text{otherwise}, \end{cases}$$

and $\check{f}(\beta,l)$ may be a three-dimensional Radon transform, namely:

$$\check{f}(\beta, l) = \int_{-\infty}^{\infty} \int_{-\infty}^{\infty} f(l\beta + s\beta_{11} + t\beta_{12}) ds \, dt. \quad (5)$$

Accordingly, the function $C(\beta,l)$ may be the Hilbert transform of the three-dimensional Radon transform. (Gel'fand and Shilov, 1964 and Bracewell, 1978).

The relationship between the surface integrals and the distribution of radioactivity may be proven as follows:

Proof 1

$$C(\beta, \Phi \cdot \beta) = -\lim_{\varepsilon \to 0} \int_0^\pi S(\Phi, \beta, \psi) p_\varepsilon(\cos\psi) d\psi. \quad (6)$$

Proof: For a function g, $$\int_{-\infty}^\infty \check{f}(\beta, t) g(t) dt = \int_{\mathcal{R}^3} f(\chi) g(\chi \cdot \beta) d\chi. \text{(Smith et al., 1977)} \quad (7)$$

By letting $g(t)=p_\varepsilon(\Phi \cdot \beta - t)$ and making a change to the variables, Equation (7) may be written as follows:

$$\int_{-\infty}^\infty \check{f}(\beta, t) p_\varepsilon(\Phi \cdot \beta - t) dt = \int_{\mathcal{R}^3} f(\Phi - \chi) p_\varepsilon(\chi \cdot \beta) d\chi. \quad (8)$$

Letting $\chi = r\alpha$ for $\alpha \in S^2$ the right hand side of the above equation becomes:

$$\int_{S^2} \int_0^{+\infty} f(\Phi - r\alpha) p_\varepsilon(r\alpha \cdot \beta) r^2 dr d\alpha, \quad (9)$$

where $d_\alpha$ may the surface detector on the unit sphere. Evaluating the above spherical integral in the same local coordinate system that was used in Equation (2) the above express becomes:

$$\int_0^{+\infty} \int_0^\pi \int_0^{2\pi} f(\Phi - rM^T\alpha(\phi, \psi)) d\phi p_\varepsilon(r\cos\psi) \sin\psi d\psi r^2 dr. \quad (10)$$

Now letting $z=\cos \psi$ results in $$\int_0^{+\infty} \int_{-1}^{+1} \int_0^{2\pi} f(\Phi - rM^T\alpha(\phi, \cos^{-1}z)) d\phi p_\varepsilon(rz) dz r^2 dr. \quad (11)$$

Taking the limits as $\varepsilon \to 0$ of the above and then using Lemma 1 (please see below) results in:

$$\lim_{\varepsilon \to 0} \int_0^{+\infty} \int_0^\pi \int_0^{2\pi} f(\Phi - rM^T\alpha(\phi, \cos^{-1}z)) d\phi p_\varepsilon(z) dz\, r\, dr \quad (12)$$

Letting $\Psi=\cos^{-1}z$ and exchanging integrals yields:

$$\int_0^{+\infty} \int_0^\pi \int_0^{2\pi} f(\Phi - rM^T\alpha(\phi, \psi)) r\, dr\, d\phi p_\varepsilon(\cos\psi) \sin\psi\, d\psi. \quad (13)$$

The conclusion of the Proof 1 may allow the substitution of Equation (13) into Equation (8), and taking the limit of Equation (8) as $\varepsilon \to 0$ and by making some variable changes.

Lemma 1 For a function g and a constant $k \ne 0$ $$\lim_{\varepsilon \to 0} \int g(t) p_\varepsilon(kt) dt = \lim_{\varepsilon \to 0} \frac{1}{k} \int g(t) p_\varepsilon(t) dt \quad (14)$$

Proof: Explicitly writing out the left hand side (LHS) of Equation (14) yields:

$$LHS = \lim_{\varepsilon \to 0} \left\{ \left( \int_{-\infty}^{-\varepsilon/|k|} + \int_{\varepsilon/|k|}^\infty \right) \frac{1}{t} g(t) dt \right\} \quad (15)$$

Replacing $\in/|k|$ with $\in$ results in $$LHS = \lim_{\varepsilon \to 0} \left\{ \left( \int_{-\infty}^{-\varepsilon} + \int_\varepsilon^\infty \right) \frac{1}{t} g(t) dt \right\} \quad (16)$$

The conclusion of Lemma 1 follows by observing that the right hand side of Equation (16) is equal to the left hand side of Equation (14).

To relate the surface integrals to the distribution of radioactivity a second function $F(\beta,l)$ may also used. For $\beta \in S^2$ and $l \in \mathfrak{R}^1$ the function is define $F(\beta,l)$ as:

$$F(\beta, \ell) \triangleq \frac{1}{\pi} \lim_{\varepsilon \to 0} \int_{-\infty}^{+\infty} H_\varepsilon(\ell - t) \check{f}(\beta, t) dt, \text{ where} \quad (17)$$

$$H_\varepsilon(t) = \begin{cases} \dfrac{1}{\varepsilon^2} & \text{for } |t| > \varepsilon \\ \dfrac{-1}{t^2} & \text{for } |t| > \varepsilon \end{cases} \quad (18)$$

If the function $F(\beta,l)$ is known on the set $$P_F \triangleq \left\{ (\beta, \ell): \beta \in \frac{s^2}{2}, |\ell| \le R \right\}$$

then the function of $f(\chi)$ can be obtained for all $\chi \in \mathfrak{R}^2$ (Smith, 1985).

The relationship between the surface integrals and distribution of radioactivity is completed with the following:

Proof 2

$$F(\beta, \ell) = \frac{1}{\pi} \frac{\partial}{\partial \ell} C(\beta, \ell) \quad (19)$$

The proof of Equation 19 follows by performing an integration by parts. (Horn, 1978 or Smith 1998).

As previously mentioned, if the function $F(\beta,l)$ may be known on the set $P_F$ then the function $f(\chi)$ for all $\chi \in \mathfrak{R}^3$ may be found. In theory, if a function is known in an arbitrarily small neighborhood of a point then the derivative of the function may be computed at that point. As a consequence, the function $C(\beta,l)$ may be known on the set $$P_C \triangleq \left\{(\beta,l): \beta \in \frac{s^2}{2}, |l| \leq R + \varepsilon\right\}$$

where $\varepsilon$ is an arbitrary positive number, then the function $F(\beta,l)$ may be obtained on the set $P_F$ via Proof 2. As such, the function $C(\beta,l)$ may be obtained on the set $P_C$ from values $S(\Phi, \beta, \psi)$ of via Proof 1 if the following condition is true:

If for almost every $(\beta,l) \in P_C$ there exists an $\Phi$ such that $\Phi \cdot \beta = 1$ where $S(\Phi, \beta, \psi)$ is known for all $0 < \psi < \pi$.

For convenience let the symbol $P_S$ represent any set of $(\Phi, \beta, \psi)$ that satisfies the above condition. Using this symbol, this method of reconstructing the distribution of radioactivity, $f(\chi)$ on $\Re^3$, from a set of surface integrals, $S(\Phi, \beta, \psi)$, may be representative symbolically as:

$$S(\Phi,\beta,\psi) \text{ on } P_S \xrightarrow{Proof\,1} C(\beta,l) \text{ on } \qquad (20)$$
$$P_C \xrightarrow{Proof\,2} F(\beta,l) \text{ on } P_F \xrightarrow{(5.2)Smith\,85} f(\chi) \text{ on } \mathcal{R}^3.$$

As such, set $P_S$ and $P_C$ define what integrals are needed to eliminate excessive data computations and provide an accurate and efficient image reconstruction method.

II. Relating Integrals of Line Integrals to a Distribution of Radioactivity

In another embodiment, a plurality of integral of line integrals may be calculated on cone projections. For example, let the symbol $S_{CB}(\Phi, \beta, \psi)$ denote the integrated cone-beam line-integrals of the distribution of radioactivity on the one sheet cone whose apex is the point $\Phi$, axis of symmetry is the unit vector $\beta$, and a half angle is $\psi$. Assuming the vertex of the line integrals lies outside the distribution of the object, the cone-beam line integrals of the distribution may be defined as $$g(\Phi,\alpha) \triangleq \int_0^\infty f(\Phi + t\alpha)\,dt. \qquad (21)$$

Using $M^T$ and $\alpha\,(\phi, \psi)$ as previously defined in Equation (1) and Equation (3), the integrated cone-beam line integrals of the distribution can be defined as:

$$S_{CB}(\Phi,\beta,\psi) \triangleq \int_0^{2\pi} g(\Phi, M^T\alpha(\phi,\psi))\,d\phi. \qquad (22)$$

The definition of the integrated cone-beam line-integral given in the Equation (22) and the surface integral given in Equation (2) may be compared for differences. First, there is a "r" radial weighting in the "dr" integral in Equation (2) that does not appear in Equation (22). This difference is significant because there is no simple way to obtain $S(\Phi, \beta, \psi)$ from $S_{CB}(\Phi, \beta, \psi)$ or vice versa. Secondly, the surface integral given in Equation (2) includes a $\sin \psi$ term that does not appear in the Equation (22). This leads to different values for these two integrals at $\psi=0$. The surface integral at $\psi=0$ equals zero. In this case, one data point may be known ahead of time. Furthermore, for the surface integrals, there may be an infinite number of significant digits. In contrast, at $\psi=0$ the integrated cone-beam line-integral may not always equal to zero. In fact, if the axis of symmetry associate with the integral intersects the distribution, then the integral is equal to $2\pi$ times the line integral of the distribution along the axis of symmetry.

Proof 3

$$F(\beta, \Phi \cdot \beta) = \lim_{\varepsilon \to 0} \int_0^\pi S_{CB}(\Phi,\beta,\psi) H_\varepsilon(\cos\psi)\sin\psi\,d\psi. \qquad (23)$$

Proof:

Letting $g(t)=H_\varepsilon(\Phi \cdot \beta - t)$ in Equation (7) and making changes to the variables results in $$\int_{-\infty}^{\infty} \check{f}(\beta,t) H_\varepsilon(\Phi\cdot\beta - t)\,dt = \int_{\mathcal{R}^3} f(\Phi-\chi)H_\varepsilon(\chi\cdot\beta)\,d\chi. \qquad (24)$$

Letting $\chi=r\alpha$ for $\alpha \in S^2$ the right hand side of the above equation becomes:

$$\int_0^\infty \int_{S^2} f(\Phi - r\alpha)H_\varepsilon(r\alpha\cdot\beta)\,d\alpha\,r^2\,dr. \qquad (25)$$

Evaluating the above spherical integral in the same local coordinate system that was used in Equation (9) the above expression becomes:

$$\int_0^\infty \int_0^{2\pi} \int_0^\pi f(\Phi - rM^T\alpha(\phi,\psi))H_\varepsilon(r\cos\psi)\,\sin\psi\,d\psi\,d\phi\,r^2\,dr. \qquad (26)$$

Now letting $z=\cos \psi$ results in $$\int_0^\infty \int_0^{2\pi} \int_{-1}^{+1} f(\Phi - rM^T\alpha(\phi,\cos^{-1}z))H_\varepsilon(rz)\,dz\,d\phi\,r^2\,dr. \qquad (27)$$

First, taking the limit $\varepsilon \to 0$ of left hand side of Equation (4) and the above expression, using Lemma 2 (discussed below), and then letting $\psi=\cos^{-1} z$ in the resulting expression and exchanging integrals, and then using Equation (14) results in $$F(\beta, \Phi \cdot \beta) = \qquad (28)$$
$$\lim_{\varepsilon \to 0} \int_0^\pi \int_0^{2\pi} \int_{-1}^\infty f(\Phi - rM^T\alpha(\phi,\psi))\,dr\,d\phi H_\varepsilon(\cos\psi)\sin\psi\,d\psi.$$

The conclusion of Proof 3 illustrates using Equations (21) and (22) in the right hand side of Equation (28).

Lemma 2

For a function g and a constant k $$\lim_{\varepsilon \to 0} \int g(t) H_\varepsilon(kt) dt = \lim_{\varepsilon \to 0} \frac{1}{k^2} \int g(t) H_\varepsilon(t) dt. \quad (29)$$

Explicitly writing out the left hand side (LHS) of Equation (29) yields:

$$LHS = \lim_{\varepsilon \to 0} \left( \frac{1}{k^2} \int_{-\varepsilon/|k|}^{\varepsilon/|k|} \left( \frac{k^2}{\varepsilon^2} \right) g(t) dt + \frac{1}{k^2} \left( \int_{-\infty}^{-\varepsilon/|k|} + \int_{\varepsilon/|k|}^{\infty} \right) \frac{(-1)}{t^2} g(t) dt \right). \quad (30)$$

Replacing $\in/|k|$ with $\in$ results in $$LHS = \lim_{\varepsilon \to 0} \frac{1}{k^2} \left( \int_{-\varepsilon}^{\varepsilon} \frac{g(t)}{\varepsilon^2} dt + \left( \int_{-\infty}^{-\varepsilon} + \int_{\varepsilon}^{\infty} \right) \frac{(-1)}{t^2} g(t) dt \right). \quad (31)$$

The conclusion of the Lemma 2 follows by observing that the right hand side of Equation (31) is equal to the right hand side of Equation (29).

As such, a sequence of equations that relate the integrated cone-beam line-integrals to a distribution of radioactivity may be proven if the function $F(\beta,l)$ is known on a set $P_F$, then the function $f(\chi)$ for all $\chi \in \Re^3$ may be found. The function $F(\beta,l)$ may be obtained on the set $P_F$ from values of $S_{CB}(\Phi, \beta, \psi)$ via Proof 3 if the following condition is true:

If for almost every $(\beta,l) \in P_F$ there exists an $\Phi$ such that $\Phi \cdot \beta = 1$ where $S_{CB}(\Phi, \beta, \psi)$ is known for all $0 < \psi < \pi$.

For convenience let the symbol $P_{SCB}$ represent any set of $(\Phi, \beta, \psi)$ that satisfies the above condition. Using this symbol, this method of reconstructing the distribution of radioactivity from such a set of integrated cone-beam line-integrals can be representative symbolically as:

$$S_{CB}(\Phi, \beta, \psi) \text{ on } P_{SCB} \xrightarrow{Proof\ 1} F(\beta, l) \text{ on } P_F \xrightarrow{5.2Smith\ 85} f(\chi) \text{ on } \Re^3. \quad (32)$$

As such, set $P_{SCB}$ and $P_F$ define what integrals are needed to eliminate excessive data computations and provide an accurate and efficient image reconstruction method.

EXAMPLES

Specific embodiments of the invention will now be further described by the following, nonlimiting examples which will serve to illustrate in some detail various features. The following examples are included to facilitate an understanding of ways in which the invention may be practiced. It should be appreciated that the examples which follow represent embodiments discovered to function well in the practice of the invention, and thus can be considered to constitute preferred modes for the practice of the invention. However, it should be appreciated that many changes can be made in the exemplary embodiments which are disclosed while still obtaining like or similar result without departing from the spirit and scope of the invention. Accordingly, the examples should not be construed as limiting the scope of the invention.

Example 1

As mentioned above, the surface integral model and the integrals of line integral model each included a set of needed integrals that when reconstructed, may obtain an image. A completeness condition as defined herein, allows for determining what data is needed to complete this set. The surface integral completeness condition is:

If on almost every plane that intersects a sphere with a radius bigger than the distribution, there is an apex where all surface integrals emanating from the apex whose axis of symmetry is normal to the plane are known, then the distribution of radioactivity can be obtained from the known integrals.

Similarly, the integrated line integral completeness condition is:

If on almost every plane that intersects the distribution, there is an apex where all the integrated cone-beam line-integrals emanating from the apex whose axis of symmetry is normal to the plane are known, then the distribution of radioactivity can be obtained from the known integrated line-integrals.

Figure 3:
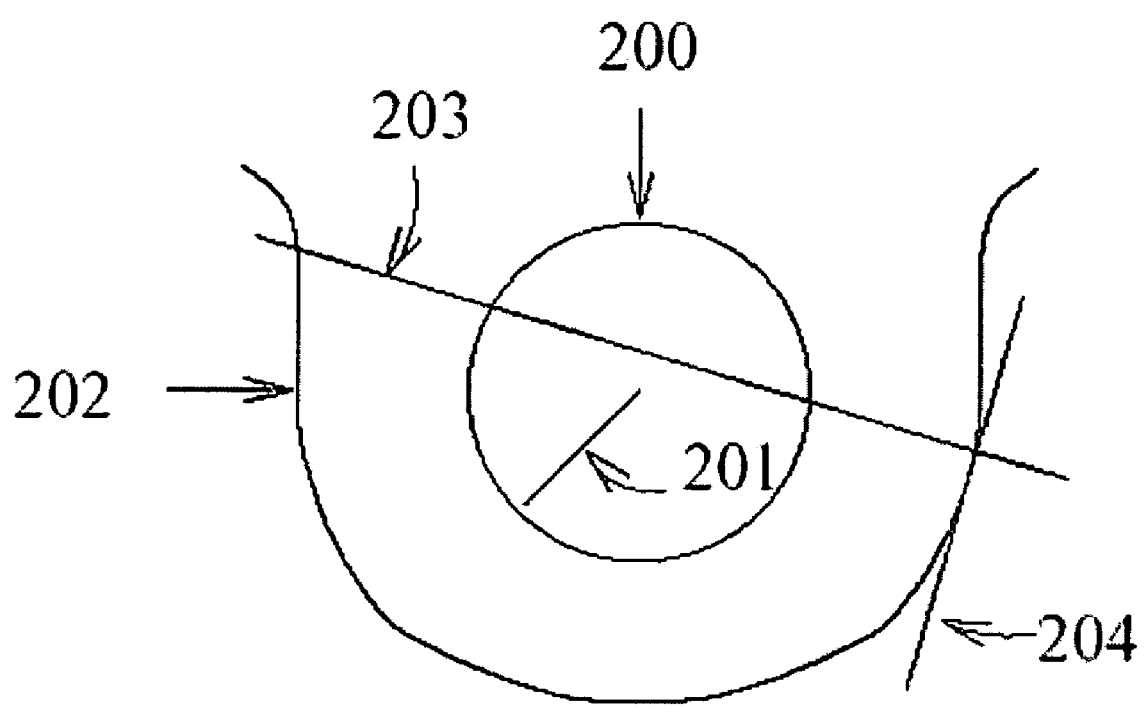
FIG. 3 illustrates an implementation of a completeness condition, according to embodiments of this disclosure.

In one embodiment, a cross-section of a sphere 200 contains a distribution of radioactivity as illustrated in FIG. 3. Sphere 200 has a radius 201 with a value of R+ϵ. FIG. 3 also shows a sine-on-the-cylinder trajectory 202. The sine-on-the-cylinder curve may be defined as a geometry that may include two periods of a sinusoid that may have been wrapped around a cylindrical surface. In particular, the geometry may be described by a vector-valued function $\Phi(\lambda) = (c_1 \cos \lambda, c_1 \sin \lambda, c_2 \sin 2\lambda)$ for $0 \leq \lambda \leq 2\pi$ where $c_1$ and $C_2$ may be selected so that a completeness condition is satisfied. (Smith, 1990). Suppose a first detector moves about the sphere 200 along trajectory 202. An arbitrary plane may intersect the trajectory 2, 3, or, 4 times. For example, plane 203 intersects the trajectory 203 four times. A line (e.g., line 204), normal to plane 203 at the intersection of the sine-on-the-cylinder trajectory 202, must have a second detector that intersects the line 204 in order to satisfy the surface integral completeness condition.

In an alternative embodiment, a detector may be large enough to subscribe a circle containing the distribution of radioactivity, where the circle has a radius larger than R+∈. If the detector rotates along a circular trajectory about the sphere, then the surface integral completeness condition can be satisfied. In one embodiment, if the distribution is too large such that the detector can not subscribe the sphere, the detector may move along a sine-on-the-cylinder trajectory to satisfy the surface integral completeness condition.

The completeness condition may further reduce the number of measurements taken. For example, for a given pair of detector elements, if a plane that intersects the first element and is perpendicular to the line that connects the two elements fails to intersect a sphere with radius of R+∈, then the data associated with these two elements do not have to be processed, and hence do not have to be measured.

The configuration of the detectors may also be considered to satisfy the completeness condition. In one embodiment, the surface integral completeness condition may be satisfied in which a first detector may be a planar detector and a second detector may be a spherical (e.g., hemisphere shape) detector. The detectors should be large enough such that a circle with a radius R+ϵ may be subscribed on the detectors and a camera rotated along a circular trajectory about the ball that contains the distribution.

In yet another embodiment, the first and second detectors may be spherical-shaped detectors. Again, if the detectors are large enough to embody a circle with radius R+ϵ with a camera including the detectors rotate along a circular trajectory about the ball that contains the distribution, the completeness condition is met.

Alternatively, the first detector may be a cylindrical detector and the second detector may be a spherical-shaped detector. Furthermore, the first and second detectors may be planar detectors. Further, there may be more that two detectors used to obtain conical data to satisfy the completeness condition.

Example 2

The Compton data is considered to be integrals, such as surface integrals or integrals of line integrals, over the points that lie on a cone that have been weighted by the Klein-Nishina distribution of scatter angles and blurred by the angular Doppler broadening. Furthermore, the data may be significantly random because of inherent randomness of the generation of photons. To develop a computational efficient reconstruction method that will mitigate the effects of this weighting, blurring, and randomness, a two-step image reconstruction method may be implemented. The first step may mitigate the effects of the weighting, blurring, and randomness to obtain a good estimate of conical surface integrals. The second step may perform a computational efficient tomographic reconstruction from estimates of the conical integrals obtained in the first step.

Step 1

First, the energy that is measured may be partitioned into "energy bins" For k=1, ..., $N_e$, the parameters $e_k$ may be chosen such that $e_k < e_{k+1}$ and $0 \leq e_k \leq e_{max}$ for all k, where $e_{max}$ may be the maximum energy level to be measured. The interval $[e_k, e_{k+1}]$ forms the $k^{th}$ energy bin. Next let Y (j, l, k) be the random variable associated with the number of photons that interact with the $j^{th}$ first detector and the $l^{th}$ detector and are counted in the $k^{th}$ energy bin.

As mentioned previously, the purpose of the first step of the reconstruction method is to mitigate the effects of the weighting, blurring, and the randomness. This mitigation may be performed independently for each pair of detectors in the first and second detector. For a given first detector j' and a given second detector l' the following may be defined. First the reconstruction volume is partitioned into hollow cone regions. As shown in FIG. 1, the variable ψ is the angle measured from the line that connects the intersection point (Φ and Φ') of a photon onto the two detectors. For m=1, ..., N the $\psi_m$'s are chosen such that $\psi_m < \psi_{m+1}$ and $0 \leq \psi_m \leq \pi$ for all m. The selection of the $\psi_m$'s are not necessarily depended upon the selection of the $e_k$'s. For example, geometrically each $\psi_m$ defines a cone whose apex is at the center of the first detector and axis of symmetry is the line that connects the centers of the detectors and the "half width" is the angle $\psi_m$. The $m^{th}$ hollow cone region is defined to be the portion of the reconstruction volume that lies in between the $\psi_m$ and $\psi_{m+1}$ cones. It should be noted for future reference that this partition is dependent upon j' and l'.

Having defined the term "hollow cone region" it can be explained why angular Doppler broadening may be thought of as having the effect of blurring the data. In the absences of angular Doppler broadening all the photons that loss a certain energy level would originate in one hollow cone region. This region would be determined by Compton's law. In the presents of angular Doppler broadening these photons, generally speaking, would originate in more than one region. This spreading out of the photons (i.e., the blurring of the photons) will degrade the quality of the images that result. Unfortunately, this blurring is shift variant which makes mitigating its negative effects difficult to do. [Evans et al., 1999]

Let W(j', l', k, m) be the random variable associated with the photons generated in the $m^{th}$ hollow cone region that are counted in the $k^{th}$ energy bin and interact with the fixed detector pair. Thus it can be written:

$$Y(j', l', k) = \sum_{m=1}^{N\psi} w(j', l', k, m) \text{ for } k = 1; \ldots ; N_e \tag{33}$$

Assume that the number of photons generated in the Nψ regions are independent and are Poisson distributed with mean α(j, l', m). The probability p(j', l', k|m) is defined to be the conditional probability that a photon will interact with the fixed detector pair and will be counted in the $k^{th}$ energy bin given that it was generated in the $m^{th}$ hollow region. From Equation (1) and from the properties of expected values of Poisson random variables [Feller, 1968] it can be written;

$$E\{Y(j', l', k)\} = \sum_{m=1}^{N\psi} p(j', l', k \mid m)\alpha(j'l', m) \text{ for } k = 1; \ldots ; N_e \tag{34}$$

Note from Equation (33) that Y(j', l', k) is a sum of independent Poisson random variables and hence is a Poisson random variable. As such, the maximum likelihood estimate of Y(j', l', k) is the number of photons measured in the $k^{th}$ energy bin for the fixed detector pair. This number will be denoted as n(j', l', k). Substituting the estimate in for the right hand side of Equation (34) yields:

$$n(j', l', k) = \sum_{m=1}^{N\psi} p(j', l', k \mid m)\alpha(j', l', m); \text{ for } k = 1; \ldots ; N_e \tag{35}$$

By using an algorithm that is known in the Art, such as a Penalized Weighted Least Square or a ML-EM algorithm, α(j', l', m) for m=1; ... ; N may be determined. The values of α(j', l', m) will be used in Step 2.

Equation (35) has a number of very advantageous features from the computational point of view. First, the processing for estimating the α (j', l', m)'s may be done independently for each pair of detectors which allows for the reconstruction method to be parallelizable. Namely, all the processing for a given detector pair may done on a given node of a parallel computer. This may allow for a reduce execution time if a parallel processing computer is used. Secondly, the values of p(j', l', k|m)'s for k=1; ... ; $N_e$ and m=1; ... ; N may be stored on a given node. If a 511 keV isotope is used and if the width of the energy bin is about 1 keV then $N_e \approx 10^{+2}$. If $N\psi \approx 10^{+2}$ as well, then the storage requirement per node would be $\approx 10^4$, which is an acceptable number. Hence the probability values can be pre-computed, storage, and read into the program when needed. Furthermore, each node would have the probability values it needs and no probability value would have to be shared from node to node and thus improving the effectiveness of the algorithm.

To find an appropriate expression for calculating p(j', l', k|m) for Equation (34), it may be assumed that the amount of energy loss by a photon is independent of the fact that the photon interacted with the $j'^{th}$ first detector and is also independent of the fact that it originated in the $m^{th}$ region. Using the definition of conditional probability, it can then be written that $$p(j',l',k|m) = p(l'|j',k,m)p(j'|m)p(k) \quad (36)$$

where p(l'|j', k, m) is the probability that a photon will interact with the $l'^{th}$ second detector given that it interacted with the $j'^{th}$ first detector and was counted in the $k^{th}$ energy bin and originated in the $m^{th}$ region;

p(j'|m) is the probability that a photon will interact with the $j'^{th}$ detector given that the photon was generated in the $m^{th}$ region; and p(k) is the probability that a photon will be counted in the $k^{th}$ energy bin.

To find an appropriate expression for p(l', j', k|m) Equation (36) needs to be modified. To obtain a relatively accurate value for p(l', j', k, m) the $m^{th}$ hollow cone region is partitioned into sub-regions. First the angle $\zeta$ may be defined as an angle around the line connecting the centers of the detectors. The domain of $\zeta$, which is [0, 2π], may be divided into $N_t$ equal length intervals. Additionally, the interval [$\psi_m$, $\psi_{m+1}$] is divided into Ns equal length intervals. The $(s,t)^{th}$ sub-region of the $m^{th}$ hollow cone region is the region defined by the interval [$\zeta_t$, $\zeta_{t+1}$], and the interval [$\psi_m$+(i−1)($\psi_{m+1}$−$\psi_m$)/$N_s$, $\psi_m$+(i)($\psi_{m+1}$−$\psi_m$)/$N_s$]. Using the definition of conditional probability and the total probability theorem, it can be written that $$p(l' \mid j', k, m) = \frac{\sum_{t=1}^{N_t} \sum_{s=1}^{N_s} p(l' \mid j', k, s, t) p(j', k, s, t)}{p(j', k, m)} \quad (37)$$

where p(l'|j', k, s, t) is the conditional probability that the photon will interact with the $l'^{th}$ second detector given that it interacted with the $j'^{th}$ first detector and was counted in the $k^{th}$ energy bin and originated in the $(s, t)^{th}$ subregion;

p(j', k, s, t) is the probability that a photon will originate in the $(s, t)^{th}$ sub-region and will be counted in the $k^{th}$ energy bin and will interact with the $j'^{th}$ first detector; and p(j', k, m) is the probability that a photon will originate in the $m^{th}$ region and will be counted in the $k^{th}$ energy bin and will interact with the $j'^{th}$ first detector.

Since the sub-regions are assumed to be small and are all within the same region, the p(j', k, s, t)'s are assumed constant with respect to the s and t. Assuming as before that the event k is independent of the other events, then the above equation can be written as $$p(l' \mid j', k, m) = \frac{p(j' \mid s, t)p(s, t)}{p(j' \mid m)p(m)} \sum_{t=1}^{N_t} \sum_{s=1}^{N_s} p(l' \mid j', k, s, t) \quad (38)$$

Now Equation (36) can be written as:

$$p(j', l', k \mid m) = p(k)p(j' \mid s, t)\frac{p(s, t)}{p(m)} \sum_{t=1}^{N_t} \sum_{s=1}^{N_s} p(l' \mid j', k, s, t) \quad (39)$$

where p(j'|s, t) is the conditional probability that a photon will interact with the $j'^{th}$ first detector given that the photon originated in the $(s, t)^{th}$ sub-region;

p(s, t) is the probability that a photon was generated in the $(s,t)^{th}$ sub-region; and p(m) is the probability that a photon was generated in the $m^{th}$ region.

To find an appropriate expression for the p(k), the "Klein-Nishina distribution," m $f_{KN}(\cdot)$, may be integrated, namely:

$$p(k) = \int_{e_k}^{e_{k+1}} h(\varsigma) f_{KN}(\varsigma) d\varsigma \quad (40)$$

where the function $h(\varsigma)$ accounts for any variation in the detector efficiency. The probability p(j'|s, t) may be calculated by performing a numerical integration of the steroangle subtended by the $j'^{th}$ detector from each point inside the (s, t)$^{th}$ sub-region. To compute the ratio of the probabilities p(s, t)/p(m) it is assumed the point within the $m^{th}$ region at which a photon was generated is equally likely. Because of this, the ratio will be taken to be the volume of the $(s,t)^{th}$ sub-region divided by the volume of the $m^{th}$ region.

Figure 4:
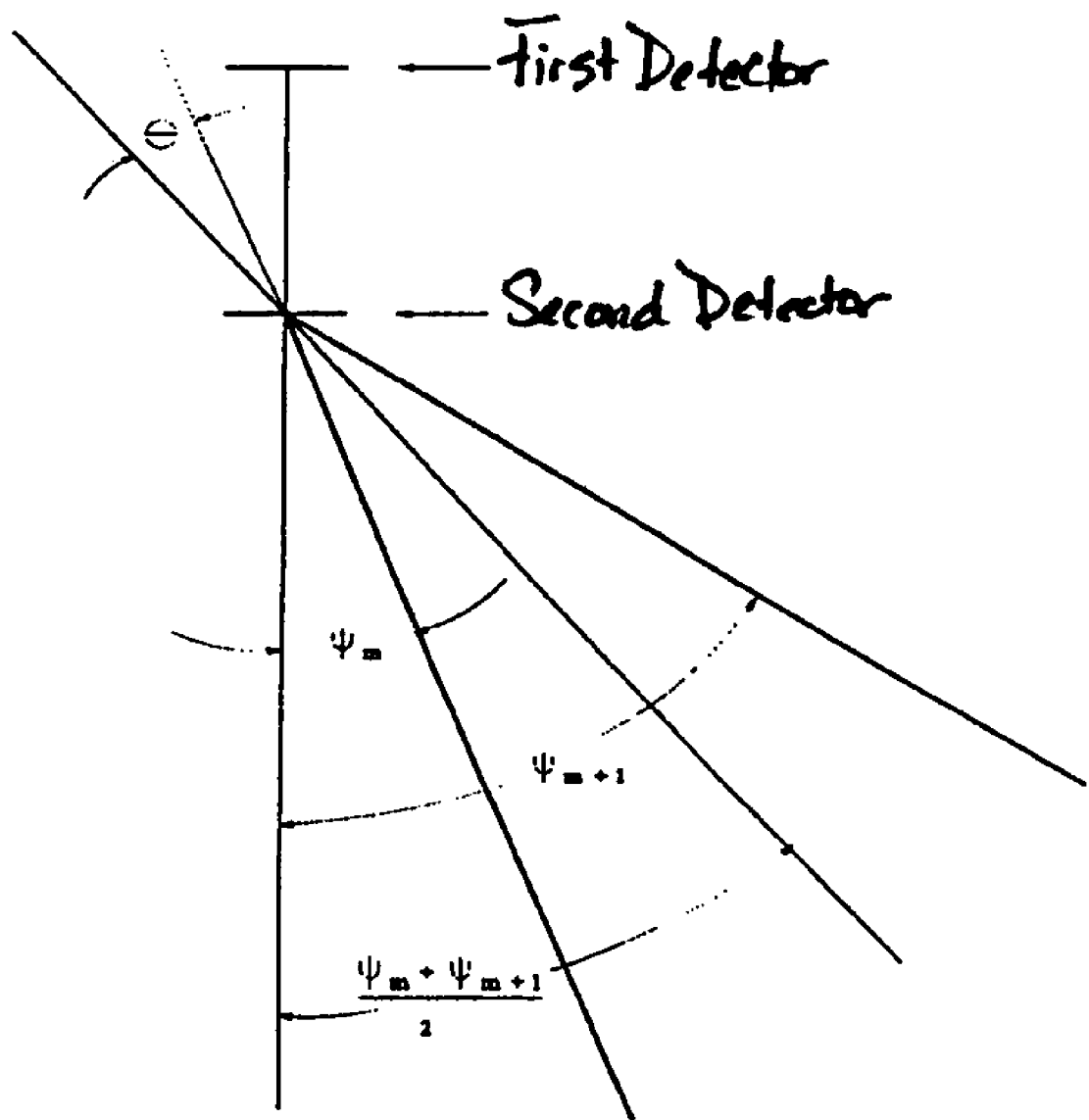
FIG. 4 shows a geometry for defining probability functions of a two-step reconstruction method, according to embodiments of this disclosure.

An appropriate expression for p(l'|j', k, s, t) for Equation (39) may found by integrating a joint probability density function. The angle θ, as illustrated in FIG. 4 which is the scatter angle, is measured from the center ray of the $(s,t)^{th}$ sub-region. The angle φ, which is the angle "around" this line, is not shown in FIG. 4 for the sake of berevity.

To define a joint probability density, it is assumed that the φ angle associated with the scatter of the photon is independent of the angle θ. This allows the joint probability density function to be written as a product of marginal probability density functions. It is further assumed that φ is uniformly distributed on the interval [0, 2π]. The marginal probability density function associated with θ is taken to be the function $f_D(\cdot,e)$, the angular Doppler broadening at the fixed energy level. Thus, the joint probability density function $f(\theta, \phi)$ for the $k^{th}$ energy bin may be defined as $$f(\theta, \phi) = \begin{cases} \frac{1}{2\pi} f_D(\theta, \frac{e_k + e_{k+1}}{2}) & \text{for } 0 \leq \theta \leq \pi \text{ and } 0 \leq \varphi \leq 2\pi; \\ 0 & \text{otherwise} \end{cases} \quad (41)$$

An appropriate expression for p(l'|j', k, m) may be found by integrating the above joint probability density function. By defining $\Omega=\Omega(j', l', s, t)$ to be the set of ordered pairs of (θ, φ) that result in the photon being detected in the $l'^{th}$ detector, it can be written that;

$$p(l' \mid j', k, s, t) = \int\int_{(\theta,\varphi)\in\Omega(j',l',s,t)} f(\theta, \varphi) d\theta d\varphi \quad (42)$$

In another embodiment, an alternative means to using Equation (39) may be values obtained empirically for the needed probabilities. For example, by placing a small radioactive source inside various locations with the $m^{th}$ region, the p(j', l', k|m)'s for the various values of k may be taken to be a relative frequency of an observation. In yet another alternative, these relative frequencies may be obtained via Monte Carlo computer simulations. An advantage of this latter method is that self absorption may be taken into account.

Step 2.

The $\alpha$ (j', l', m)'s obtained in $S_{TEP}$ 1 may be an input to the reconstruction method used in this step. In one embodiment, surface integrals models or the integrals of line integral models, as described above, may be used in the reconstruction method. For example, Equation (20) and (32) may be used to reconstruct an image. Alternatively, an ART-like or a SIRT-like algorithm may be developed. Further, an ML-EM may be implemented. For example, by voxelizing the reconstruction volume, an equation analogous to Equation (35) may be developed. However, the probability term would be a conditional probability that a photon will interact with the fixed element pair and will be counted in the $k^{th}$ energy bin that may be generated for a certain voxel.

With the benefit of the present disclosure, those having skill in the art will comprehend that techniques claimed herein and described above may be modified and applied to a number of additional, different applications, achieving the same or a similar result. The claims cover all modifications that fall within the scope and spirit of this disclosure.

REFERENCES

Each of the following is incorporated by reference in its entirety.

Bracewell, R. N. (1978). *The Fourier Transform and its Applications*. McGraw-Hill, New York, N.Y.

Evans, B. L. et al. (1999). "Deconvolution of shift-variant broadening for Compton scatter imaging," *Nuclear Instruments and Methods in Physics Research A*, vol. 422, pp. 661-666.

Feller, W. (1968). *An introduction to probability theory and its applications*, vol. 1. New York: Wiley, 3 ed.

Gel'fand, I. M. and Shilov, G. E. (1964). *Generalized Functions: Volume* 1 *Properties and Operations*, volume 1. Academic Press, New York.

Horn, B. K. P. (1978). Density reconstruction using arbitrary ray-sampling schemes. *Proc. IEEE* 66(5): 551-562.

Smith, B. D. (1985). Image reconstruction from cone-beam projections: necessary and sufficient conditions and reconstruction methods. *IEEE Transactions on Medical Imaging*, MI-4: 14-28.

Smith, B. D. (1987). *Computer-aided tomography imaging from cone-beam data*. Ph.D. thesis, University of Rhode Island.

Smith, B. D. (1990). *Cone-beam tomography: recent advances and a tutorial review.* vol. 29(5), pp. 533.

Smith, K. T. et al. (1977). Practical and mathematical aspects of the problem of reconstructing objects from radiographs. *Bull. Amer. Math. Soc.,* 83:1227-1270.

The invention claimed is:

1. A method, comprising:
    determining an apex of a cone from a trajectory of a photon emitted from an object to a point of intersection on a first detector;
    determining an axis of symmetry of the cone from the point of intersection on the first detector and a point of intersection on a second detector;
    determining a half-angle of the cone;
    using a finite set of integrals dependent on the apex of the cone, the half angle of the cone, and the axis of symmetry of the cone to satisfy a completeness condition where:
        i) if the finite set of integrals comprises surface integrals and if a plane that intersects a sphere with a radius bigger than a distribution where all the surface integrals emanates from the apex whose axis of symmetry is normal to the plane, then
            obtaining a distribution of radioactivity from the surface integrals; or
        ii) if the finite set of integrals comprises line integrals and if a plane that intersects a distribution where all the line-integrals emanates from the apex whose axis of symmetry is normal to the plane, then
            obtaining a distribution of radioactivity from the integrated line-integrals; and
    using the finite set of integrals for image reconstruction.

2. The method of claim 1, the apex of the cone comprising the point of intersection on the first detector.

3. The method of claim 1, the axis of symmetry comprising determining a scatter angle of the photon from the first detector onto the second detector.

4. The method of claim 3, the scatter angle ranging from 0° to 180°.

5. The method of claim 3, the half-angle of the cone comprising the scatter angle of the photon.

6. The method of claim 1, the step of calculating comprises providing filbert transforms on partial derivatives of a three-dimensional Radon transform.

7. The method of claim 1, the finite set of integrals of the cone comprising computing surface integrals of the cone.

8. The method of claim 1, the finite set of integrals of the cone comprising computing integrated line integrals of the cone.

9. The method of claim 1, the image reconstruction comprising implementing a two-step reconstruction method.

10. The method of claim 1, the object comprising a human.

11. The method of claim 1, the object comprising an animal.

12. The method of claim 1, the object comprising a nuclear facility.

13. The method of claim 1, the object comprising a missile.

14. The method of claim 1, the object comprising a nuclear waste site.

15. A method for image reconstruction, comprising:
    obtaining a set of conical integrals to satisfy a completeness condition where:
        i) if the set of conical integrals comprise surface integrals and if a plane that intersects a sphere with a radius bigger than a distribution where the surface integrals emanate from an apex whose axis of symmetry is normal to the plane, then
            obtaining a distribution of radioactivity from the surface integrals; or ii) if the set of conical integrals comprise line integrals and if a plane that intersects a distribution where the line integrals emanate from the apex whose axis of symmetry is normal to the plane, then
obtaining a distribution of radioactivity from the integrated line integrals; and using the set of conical integrals for image reconstruction.

16. The method of claim 15, further comprising defining a cone from a trajectory of a photon from an object through a first detector and second detector.

17. The method of claim 16, the step of defining a cone comprising determining an apex, an axis of symmetry, and a half-angle of the cone.

18. The method of claim 15, further comprising calculating a Hilbert transforms on partial derivatives of a three-dimensional Radon transform.

19. The method of claim 15, the step of relating further comprising reconstructing an image.

20. The method of claim 19, the step of reconstructing comprising implementing a two-step reconstruction method.

21. The method of claim 19, the step of reconstruction comprising an ART-like or a SIRT-like reconstruction method.

22. The method of claim 19, the step of reconstruction comprising an ML-EM reconstruction method.

23. A method for image reconstruction, comprising:
obtaining a set of integrated line integrals to satisfy a completeness condition where if a plane that intersects a distribution where the set of integrated line integrals emanates from an apex whose axis of symmetry is normal to the plane, then the distribution of radioactivity from the integrated line integrals is determined;
relating the set of integrated line integrals to a distribution of radioactivity; and
using the integrated line integrals for image reconstruction.

24. A method for image reconstruction, comprising:
obtaining a set of surface integrals to satisfy a completeness condition where if a plane that intersects a sphere with a radius bigger than a distribution where the set of surface integrals emanates from the apex whose axis of symmetry is normal to the plane, then the distribution of radioactivity from the surface integrals is determined;
relating the set of surface integrals to a distribution of radioactivity; and
using the set of surface integrals for image reconstruction.

25. A computer readable medium comprising instructions for:
calculating a set of conical integrals to satisfy a completeness condition where:
i) if the set of conical integrals comprise surface integrals and if a plane that intersects a sphere with a radius bigger than a distribution where the surface integrals emanate from an apex whose axis of symmetry is normal to the plane, then
obtaining a distribution of radioactivity from the surface integrals; or
ii) if the set of conical integrals comprise line integrals and if a plane that intersects a distribution where the integrated line-integrals emanate from an apex whose axis of symmetry is normal to the plane, then
obtaining the distribution of radioactivity from the integrated line integrals.

26. The computer readable medium of claim 25, further comprising instructions for determining an apex and an axis of symmetry of a cone.

27. The computer readable medium of claim 25, further comprising instructions for calculating Hilbert transforms on partial derivatives of a three-dimensional Radon transform of the cone on the set of conical integrals.

28. The computer readable medium of claim 25, further comprising instructions for implementing a two-step image reconstruction.

29. A system, comprising:
a Compton camera;
at least two detectors coupled to the camera, the at least two detectors configured to obtain conical data to satisfy a completeness condition, where:
i) if a plane that intersects a sphere with a radius bigger than a distribution where surface integrals emanates from an apex whose axis of symmetry is normal to the plane, then a distribution of radioactivity from the surface integrals is determined; or
ii) if a plane that intersects a distribution where all integrated cone-beam line-integrals emanates from an apex whose axis of symmetry is normal to the plane, then a distribution of radioactivity from the integrated line-integrals is determined.

30. The system of claim 29, the camera being configured to move along a sine-on-cylinder curve.

31. The system of claim 29, the camera being configured to move along a circular path.

32. The system of claim 29, the at least two detectors comprising planar detectors.

33. The system of claim 29, the at least two detectors comprising a planar detector and a spherical-shaped detector.

34. The system of claim 29, the at least two detectors comprising a cylindrical detector and a spherical-shaped detector.

35. The system of claim 29, the at least two detectors comprising spherical-shaped detectors.

* * * * *

UNITED STATES PATENT AND TRADEMARK OFFICE
CERTIFICATE OF CORRECTION

PATENT NO. : 7,262,417 B2 Page 1 of 1
APPLICATION NO. : 10/811069
DATED : August 28, 2007
INVENTOR(S) : Bruce Douglas Smith It is certified that error appears in the above-identified patent and that said Letters Patent is hereby corrected as shown below:

In claim 6, column 16, line 38, please delete "filbert" and insert --Hilbert-- therefor.

Signed and Sealed this

Eleventh Day of December, 2007

JON W. DUDAS
*Director of the United States Patent and Trademark Office*